2,937,172
ALKOXYETHYLGUANAMINES

Seymour L. Shapiro, Hastings on Hudson, Louis Freedman, Bronxville, and Vincent A. Parrino, Bayside, N.Y.

No Drawing. Application November 26, 1958
Serial No. 776,415

1 Claim. (Cl. 260—249.9)

This invention is concerned with novel triazine compounds which have valuable physiological properties.

More particularly, this invention is concerned with triazine compounds of the following formulae

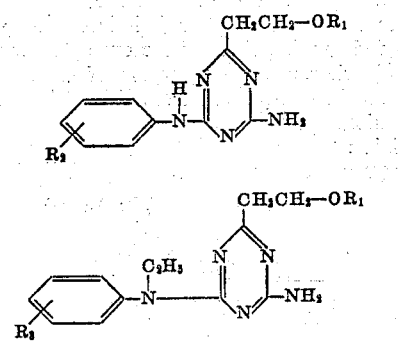

wherein $R_1$ is methyl and ethyl, $R_2$ is selected from the group consisting of o-methyl and m-methyl, m-chloro and p-chloro, and $R_3$ is selected from the group consisting of hydrogen, o-methyl, m-methyl, m-chloro and p-chloro. The compounds are substituted guanamines and specifically, are 2-amino-4-(substituted anilino)-6-(β-alkoxyethyl)-s-triazines.

The compounds of this invention have anticonvulsant, hypnotic and sedative properties.

The synthesis of the compounds of this invention proceed by interaction of the β-alkoxypropionate ester with the biguanide in an alcoholic solvent. Catalytic quantities of sodium methoxide may be added. After a suitable reaction period, usually from 24–96 hours at 20° C., the reaction mixture is decanted into water and the product recovered by filtration. Alternatively, the biguanide is treated in aqueous acetonitrile with the β-alkoxy acid chloride, using sodium hydroxide as an acid acceptor to yield the product.

The required biguanides which serve as initial reactants are prepared by reaction of equivalent quantities of the substituted aniline, and 3 N hydrochloric acid and dicyandiamide.

The compounds listed in Table I are indicative of the scope of the invention, and the pharmacological activity of the compounds.

TABLE I

*Characteristics and anticonvulsant activity of typical triazines*

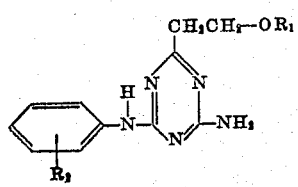

$R_1 = CH_3$

| No. | $R_2$ | M.P., °C. | $LD_{min.}$ [a] | AC [b] |
|---|---|---|---|---|
| 1 | 2—CH₃ | 121–124 | 600 | 4+ |
| 2 | 3—Cl | 162–163 | 370 | 3+ |
| 3 | 4—Cl | 130–133 | 275 | 4+ |
| 4 | 3—CH₃ | 111–112 | 500 | 4+ |
| 5 | 3—CH₃ | 149–151 | 275 | 4+ ($R_1$=ethyl) |

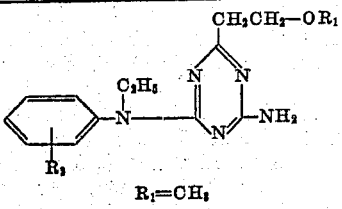

$R_1 = CH_3$

| 6 | 4—Cl | 107–112 | 325 | 4+ |
| 7 | 2—CH₃ | 105–106 | 370 | 4+ |
| 8 | H | 109–111 | 200 | 4+ |

[a] $LD_{min.}$ is the minimum lethal dose as established by subcutaneous injection in mice.
[b] AC represents the anticonvulsant rating, and the method for evaluation is recorded by Shapiro et al., J. Am. Chem. Soc., 80, 1648 (1958).

The following structural modifications such as replacement of the substituted anilino group with alkyl or arylalkylamino groups, or having the hydrogen or the ethyl group on the anilino nitrogen replaced by methyl or bulkier groups such as allyl, butyl or isoamyl, or having an unsubstituted anilino group, or fluoro or iodosubstituted anilino groups, or p-toluidino groups, were associated with considerable reduction or disappearance of the anticonvulsant activity.

The compounds of this invention are weak bases, and will form salts with the strong mineral acids such as hydrochloric, hydrobromic, sulfuric acid and the like, and such salts are within the purview of this invention.

The present invention will be described in greater detail in conjunction with the following specific examples which are typical but are not to be construed as limiting.

EXAMPLE 1

*2-amino-4-(o-methylanilino) - 6 - (β-methoxyethyl)-s-triazine.*—A solution of 5.0 g. (0.022 mole) of (o-methylphenyl)biguanide hydrochloride in 70 ml. of methanol was treated with a solution of 1.02 g. (0.044 mole) of sodium in 30 ml. of methanol followed by 3.5 ml. of methyl(β-methoxy)propionate. After 72 hours at 20° C. the reaction mixture was decanted into 125 ml. of water and after 7 days the product, 2.5 g., which separated was recrystallized (acetonitrile) and melted at 121–124° C.

*Analysis.*—Calcd. for $C_{13}H_{17}N_5O$: C, 60.2; H, 6.6. Found: C, 60.6; H, 7.2.

EXAMPLE 2

*2-amino-4-(p-bromoanilino) - 6 - (β-methoxyethyl)-s-triazine.*—In a manner similar to that described for Example 1, and using (p-bromophenyl)biguanide, the product (1.1 g.) was obtained from a 0.01 mole run, recrystallized (methanol-water) and melted at 114–117° C.

*Analysis.*—Calcd. for $C_{12}H_{14}BrN_5O$: C, 44.4; H, 4.4; N, 21.6. Found: C, 44.2; H, 4.5; N, 21.6.

EXAMPLE 3

*2-amino-4-(p-chloroanilino) - 6 - (β-methoxyethyl)-s-triazine.*—In a manner similar to that described for Example 1, and using (p-chlorophenyl)biguanide, the product (1.3 g.) was obtained in a 0.01 mole run, was recrystallized (methanol-water) and melted at 130–133° C.

*Analysis.*—Calcd. for $C_{12}H_{14}ClN_5O$: C, 51.5; H, 5.0; N, 25.0. Found: C, 52.3; H, 5.1; N, 25.4.

EXAMPLE 4

*2-amino-4-(m-methylanilino) - 6 - (β-methoxyethyl)-s-triazine.*—In a manner similar to that described for Example 1, and using (m-methylphenyl)biguanide, the product (2.1 g.) was obtained in a 0.03 mole run, was recrystallized (acetonitrile) and melted at 111–112° C.

*Analysis.*—Calcd. for $C_{13}H_{17}N_5O$: C, 60.2; H, 6.6; N, 27.0. Found: C, 60.3; H, 6.6; N, 27.2.

EXAMPLE 5

*2 - amino-4-(N-ethyl-[o-methyl]anilino)-6-(β-methoxyethyl)-s-triazine.*—A suspension of 6.8 g. (0.031 mole) of N′-ethyl-N′-(o-methylphenyl)biguanide hydrochloride in 25 ml. of acetonitrile and a solution of 2.5 g. (0.062 mole) of sodium hydroxide in 16 ml. of water was stirred and maintained at 0° C. by external cooling during the addition of a solution of 6.3 g. (0.046 mole) of β-methoxypropionyl chloride in 10 ml. of acetonitrile. The reaction mixture was stored at 20° C. for 4 hours and the solvents evaporated under vacuum. The residue was treated with 50 ml. of methanol and decanted into 125 ml. of water. The precipitate of product (7.1 g.) which separated was recrystallized (acetonitrile) and melted at 105–106° C.

*Analysis.*—Calcd. for $C_{15}H_{21}N_5O$: C, 62.7; H, 7.4; N, 24.4. Found: C, 62.9; H, 7.3; N, 24.4.

EXAMPLE 6

*2 - amino-4-(N-ethyl-[p-chloro]anilino)-6-(β-methoxyethyl)-s-triazine.*—In a manner similar to that described in Example 1, and using N′-ethyl-N′-(p-chlorophenyl)biguanide hydrochloride, the product (3.1 g.) obtained in an 0.018 mole run was recrystallized (acetonitrile) and melted at 107–112° C.

*Analysis.*—Calcd. for $C_{14}H_{18}ClN_5O$: C, 54.7; H, 5.9; N, 22.7. Found: C, 55.1; H, 5.8; N, 22.8.

EXAMPLE 7

*2-amino-4-(N-ethylanilino) - 6 - (β-methoxyethyl)-s-triazine.*—In a manner similar to that described in Example 1, and using N′-ethyl-N′-phenylbiguanide hydrochloride, the product (4.1 g.) obtained in a 0.025 mole run was recrystallized (acetonitrile) and melted at 109–111° C.

*Analysis.*—Calcd. for $C_{14}H_{19}N_5O$: C, 61.5; H, 7.0; N, 25.6. Found: C, 62.2; H, 7.2; N, 26.0.

EXAMPLE 8

*2-amino-4-(m-methylanilino) - 6 - (β - ethoxyethyl)-s-triazine.*—A solution of 5.0 g. (0.022 mole) of (m-methylphenyl)biguanide hydrochloride in 50 ml. of methanol was treated with a solution of 1.02 g. (0.044 mole) of sodium in 28 ml. of methanol followed by 3.5 ml. of ethyl (β-ethoxy)propionate. After 72 hours at 20° C. the reaction mixture was decanted into 90 ml. of water. After 7 days, the product (2.7 g.) which separated was recrystallized (acetonitrile) and melted at 149–151° C.

*Analysis.*—Calcd. for $C_{14}H_{19}N_5O$: C, 61.5; H, 7.0. Found: C, 61.6; H, 6.6.

EXAMPLE 9

*2-amino-4-(N-ethylanilino) - 6 - β - ethoxyethyl-s-triazine.*—In a manner similar to that described for Example 8, using N′-ethyl-N′-phenylbiguanide hydrochloride, the product (3.5 g.) was obtained and recrystallized (acetonitrile) and melted at 75–82° C.

*Analysis.*—Calcd. for $C_{15}H_{21}N_5O$: C, 62.7; H, 7.4. Found: C, 63.5; H, 7.1.

The novel compounds of this invention can be combined with solid or liquid pharmaceutical carriers and formulated into the form of tablets, powder packets or capsules, or, dissolved in suitable solvents for oral and parenteral administration for human or veterinary use.

It is to be understood that it is intended to cover all changes and modifications of the examples of the invention herein chosen for the purpose of illustration which do not constitute departure from the spirit and scope of the invention.

We claim:

The compound

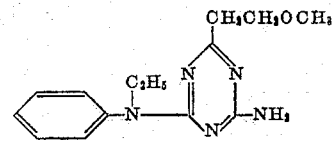

References Cited in the file of this patent

UNITED STATES PATENTS

| | | |
|---|---|---|
| 2,309,663 | Oldham | Feb. 2, 1943 |
| 2,394,526 | Thurston | Feb. 4, 1946 |
| 2,777,848 | Schaefer | Jan. 15, 1957 |
| 2,926,165 | Shapiro et al. | Feb. 23, 1960 |

OTHER REFERENCES

Overberger et al.: Journal of the American Chemical Society, vol. 76, pp. 1061–1065 (1954).

Overberger et al.: Journal of the American Chemical Society, vol. 76, pp. 1855–1858 (1954).